3,564,004
PROCESS FOR THE PREPARATION OF 2-(1'-H-HALOGENOALKYL)-Δ²-OXAZOLINES
Otto Scherer, Bad Soden, Taunus, Helmut Hahn and Robert Hartwimmer, Burghausen, Salzach, Siegfried Rebsdat, Altotting, and Erich Schuierer, Burghausen, Salzach, Germany, assignors to Farbwerke Hoechst Aktiengesellschaft vormals Meister Lucius & Bruning, Frankfurt am Main, Germany, a corporation of Germany
No Drawing. Filed June 30, 1969, Ser. No. 837,919
Claims priority, application Germany, July 4, 1968, P 17 70 789.0
Int. Cl. C07d 85/36
U.S. Cl. 260—307                                         6 Claims

ABSTRACT OF THE DISCLOSURE 2-(1'-H-halogenoalkyl)-Δ²-oxazolines are obtained by reacting 1,1-difluoroethylenes with ethanolamine. The products are useful as monomers or comonomers for the preparation of poly-N-vinyl carboxylic acid amides, capable of rendering fibrous materials water- and oil-repellent.

---

The present invention concerns a process for the preparation of 2-(1'-H-halogenaolkyl)-Δ²-oxazolines, which comprises reacting 1,1-difluoroethylenes with ethanolamine, especially a process for the preparation of 2-(1'-H-halogenoalkyl)-Δ²-oxazolines of the formula

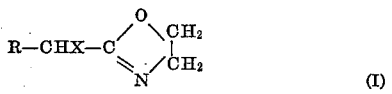
(I)

in which R is hydrogen, fluorine or chlorine or a group of the formula $F_3C-(CF_2)_n-$, in which $n$ is an integer of 0 to 10, and X is fluorine or chlorine, which comprises reacting an olefin of the formula $$R-CX=CF_2 \quad (II)$$

in which R and X have the meanings given above, with ethanolamine. It is already known to prepare Δ²-oxazolines substituted in the 2-position, from carboxylic acids or derivatives thereof by reaction with ethanolamine (see Seelinger, Angew. Chem., 78 (1966) 913). In the latter literature as the most simple synthesis method the dehydrogenation in the gaseous phase of β-hydroxy-ethyl-carboxylic acid amides (obtained from ethanolamine and carboxylic acid or a carboxylic acid ester) in the presence of an aluminum oxide catalyst, at temperatures between 320 and 575° C. under a pressure of 0.5 to 20 torr is proposed.

2-perfluoroalkyl-Δ²-oxazolines have been already obtained by condensation of perfluoroalkyl-nitriles with 2-chloroethanol in the presence of an excess of trimethylamine (cf. H. C. Brown and Ch. R. Wetzel, J. Org. Chem. 30 (1965) 3729). However, in that source it is stated that the oxazolines formed were only slightly more thermo-stable than were the imido esters obtained as intermediates and that the oxazolines are easily transformed into the corresponding N-vinyl-carboxylic acid amides.

Moreover, in British patent specification 1,123,671 there is disclosed a process for the manufacture of 2-fluoroalkyl-Δ²-oxazolines starting from the corresponding β-chloroethylcarboxylic acid amides and using bases.

All of the known methods are rather complicated or require starting substances that are difficultly accessible. Contrary thereto the present process provides a simple and many-sided reaction using easily accessible starting materials.

The reaction is strongly exothermic. Since the 2-halogenoalkyl-Δ²-oxazolines rearrange thermally more or less easily to the corresponding N-vinyl-carboxylic acid amides the heat of reaction is preferably removed by means of an inert solvent. Hence, the temperature of reaction also depends on the stability of the product.

As inert solvents especially lower halogenated hydrocarbons, for example methylene chloride, chloroform, carbon tetrachloride, 1,2-dichloroethane, trichloroethylene or ethylene tetrachloride are suited. Furthermore, acetone, benzene, or toluene can be used. It is also possible to use for removing the heat of reaction the ethanolamine or, if the boiling point permits so, an excess of the fluorinated olefin. The solvent or diluent most suitable in the individual case is chosen depending on the thermal stability of the final product and its separability from the reaction medium. In doubltful cases the most convenient reaction medium is easily determined by a preliminary test. Owing to its low boiling point and hence ready separability especially methylene-chloride has proved as solvent. Thus the reaction is generally performed at a temperature in the range of about 0 to about 120° C., preferably about 20 to about 100°, especially about 35 to about 45° C.

The products of the invention are, partly, known compounds. The 2-(1'-H-fluoroalkyl)-Δ²-oxazolines are easily polymerizable with perox acids and provide polymers suitable for rendering fibrous materials water and oil repellent.

The invention is illustrated by the following examples which, however, are not intended to limit the invention thereto.

EXAMPLE 1

233 g. (1.55 mol) of perfluoropropylene were passed within five hours into a solution of 368 g. (6 mols) of ethanolamine in 1000 ml. of methylene chloride while vigorously stirring. The internal temperature rose until the solvent started boiling under reflux. The speed of the supply was so adjusted that on a cooling device fed with acetone and solid $CO_2$ a reflux as low as possible a reflux occurred.

The obtained reaction mixture was shaken four times with 200 ml. of water and the organic phase was fractionated. After distilling off the methylene chloride, 9.7 g. of first runnings having a boiling point of 25–54° C. under a pressure of 30 mm. of mercury and 185 g. (69.8%) of 2-(1'-H-perfluoroethyl-Δ²-oxazoline boiling at 54–56.5° C. were obtained. The infrared spectrum showed a (—C=N—) peak at 1670 cm.[1]. At hydrolysis

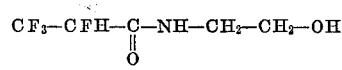

formed quantitatively.
Calc'd for $C_5H_7NO_2F_4$ (189.11) (percent): C, 31.9; H, 3.8; F, 40.2. Found (percent): C, 31.75; H, 3.73; F, 40.2.

EXAMPLE 2

To a mixture of 100 g. (1.64 mol) of ethanolamine and 500 ml. of methylene chloride there were added dropwise 100 g. (0.286 mol) of perfluoroheptene-1 within two hours while vigorously stirring. The mixture was first shaken with water, then with a sodium carbonate solution (5% strength) and once more with water. The organic phase was distilled.
The yield amounted to 67.75 g. (64%) of 2-(1-H'-perfluoroheptyl)-Δ²-oxazoline boiling at 78–81° C. under a pressure of 12.5 mm. of mercury.

EXAMPLE 3

245 g. (2.5 mols) of 1,1-difluoro-2-chloro-ethylene were reacted with 300 g. (5 mols) of ethanolamine as described in Example 1.

215 g. (70%) of 2-chloromethyl-$\Delta^2$-oxazoline having a boiling point of 68° C. under a pressure of 9 mm. of mercury were obtained.

EXAMPLE 4

264 g. (2 mols) of 1,1-difluoro-2,2-dichloroethylene were reacted with ethanolamine (183 g., i.e., 3 mols) as described in Example 1. 192 g. (62%) of 2-dichloromethyl-$\Delta^2$-oxazoline were obtained boiling at 93° C. under a pressure of 17 mm. of mercury.

We claim:

1. A process for the preparation of 2-(1'-H-halogenoalkyl)-$\Delta^2$-oxazolines of the formula

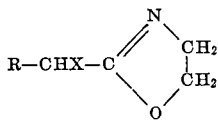

in which R is hydrogen, fluorine or chlorine or a group of the formula $F_3C$—$(CF_2)_n$—, in which $n$ is an integer of 0 to 10, and X is fluorine or chlorine, which comprises reacting an olefin of the formula $$R—CX=CF_2$$

in which R and X have the meanings given above, with ethanolamine at a temperature of about 0 to about 120° C.

2. The process as claimed in claim 1, wherein a solvent or diluent is used.

3. The process as claimed in claim 2, wherein a lower halogenated hydrocarbon is used as solvent.

4. The process as claimed in claim 2, wherein the reaction is performed at a temperature in the range of about 20° C. to the boiling point of the solvent or diluent.

5. The process as claimed in claim 1, wherein the reaction is performed at about 20 to about 60° C.

6. The process as claimed in claim 1, wherein the temperature is in the range of about 35 to 45° C.

References Cited
UNITED STATES PATENTS
3,293,245  12/1966  Litt et al. _____ 260—244

ALEX MAZEL, Primary Examiner

R. V. RUSH, Assistant Examiner